United States Patent [19]
Marcy

[11] 3,719,879
[45] March 6, 1973

[54] SYSTEM FOR ACCURATELY POSITIONING AN OBJECT UNDER THE CONTROL OF PROGRAMMED NUMERICAL DATA

[75] Inventor: Raymond Marcy, Paris, France
[73] Assignee: Thomson-CSF, Paris, France
[22] Filed: July 15, 1971
[21] Appl. No.: 162,846

[30] Foreign Application Priority Data
July 17, 1970 France..............................7026430

[52] U.S. Cl...................................318/593, 318/640
[51] Int. Cl............................................G05b 11/18
[58] Field of Search..............................318/594, 640

[56] References Cited
UNITED STATES PATENTS
3,493,827  2/1970  Tinkler................................318/594
3,566,239  2/1971  Taniguchi.........................318/640 X
3,531,800  9/1970  Brescia.............................318/594 X
3,465,220  9/1969  Rabian et al.....................318/640 X Primary Examiner—Benjamin Dobeck
Attorney—Cushman, Darby & Cushman

[57] ABSTRACT

System for accurately positioning objects in one plane by means of translational movements in one or more directions which comprises a numerically controlled stepping motor providing a coarse displacement, and piezoelectric ceramics included in a digital control loop for providing a fine displacement upon halting of the motor.

The system is applicable in particular to mask machines used for the manufacture of integrated circuitry.

10 Claims, 2 Drawing Figures

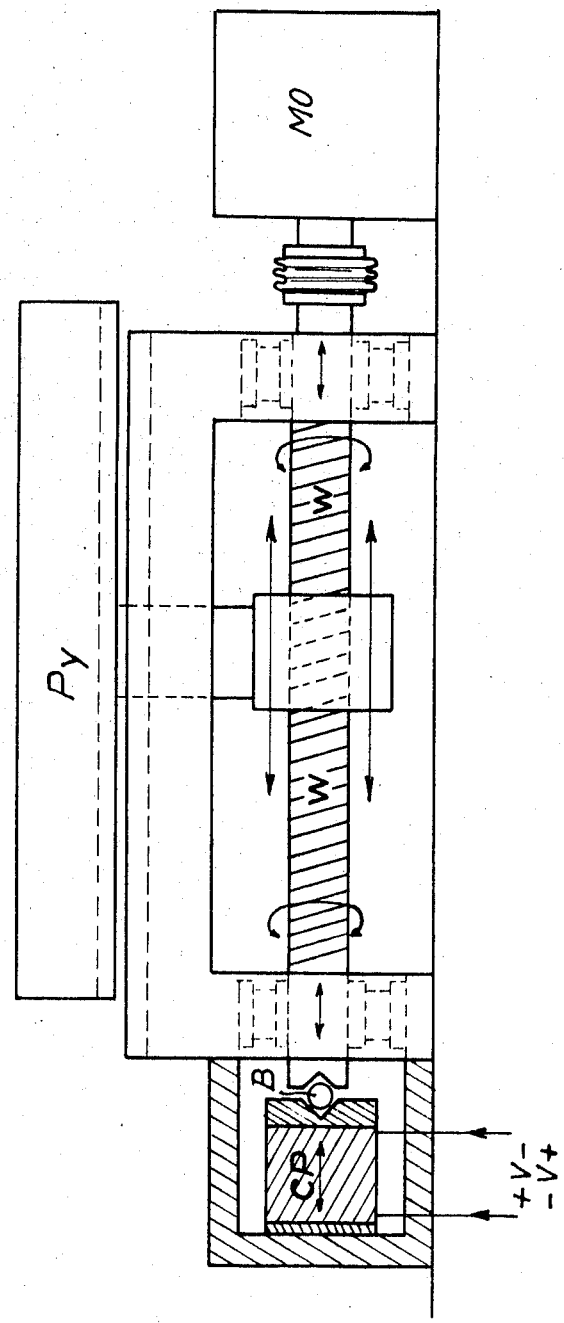
Fig_2

SYSTEM FOR ACCURATELY POSITIONING AN OBJECT UNDER THE CONTROL OF PROGRAMMED NUMERICAL DATA

The present invention relates to improvements in high-systems for accurately positioning objects in one plane, by means of translational movements of said objects in one or more directions, and relates more particularly, to the control elements of such systems.

Improved high-accuracy positioning systems in accordance with the invention can be used, for example, in machines employed to manufacture high-accuracy components. In one particularly relevant application, these components can be integrated subminiaturized circuits or the masks used to manufacture these latter; in the latter case, the positioning systems constitute the "translating table" of mask machines, and comprise two crossed translating plates, movable in two mutually perpendicular directions, X and Y for example.

The component to be processed with for example be a photographic plate upon which patterns have been recorded by means of a light beam, advantageously a laser light beam. In certain improved mask machines, the patterns are programmed and are produced through the agency of combined displacements of the plate and the laser beam which is deflected by a linear digital deflecting device, the totality of these displacements being controlled by a computer which is supplied with programmes characteristic of the patterns which are to be recorded.

High-precision positioning systems of the kind forming the subject of the present invention, can be applied particularly well, yet not exclusively, to machines of this kind.

In a more general way, the systems are applicable to machines in which high-precision positioning of components is effected by means of translatory motions, and in which a device for measuring said translatory movements is provided, which utilizes interferometer techniques and produces quantized measurements of said translatory movements.

Measuring devices of this kind are equally well known to the person skilled in the art and require no further description here. The simplest versions enable the translatory movements to be measured by simple counting up and counting off, of interference fringes detected by means of photoelectric elements, the changes in the direction of transfer being characteristic of changes in the direction of translation; the measurement quanta, and consequently the accuracy of the measurement, are in this case equal to half the width of the fringes and therefore to a quarter of the wavelength of the light source employed. More elaborate versions enable higher accuracies to be achieved by means of k systems of interleaved fringes, ($k = 2, 4$, etc . . . ); the latter allows measurements to be carried out within a limit of accuracy of $\lambda/4k$, $\lambda$ being the wavelength of the source employed.

Self-evidently, it is particularly desirable to be able to control the translatory movements of the plates by a numerical control system.

Generally speaking, in the prior art high-accuracy positioning systems, crossed translation plates are actuated by numerically controlled d.c. motors. In order to get adequate accuracy in the positioning which is achieved when the plates are halted, the d.c. motors are integrated into positional feedback loops which compare the desired theoretical values with the actual values which are measured by coded scales for example.

A major drawback of systems of this kind is that the motors themselves are incorporated into the feedback loops so that instabilities can occur as a consequence, which often require very delicate adjustment.

The object of the present invention is to create a high-precision system for positioning an object in one plane, in which the motors and their control elements do not form part of the feedback loops, thus enabling easier adjustment whilst ensuring high accuracy.

According to the present invention, there is provided a system for accurately positioning an object under the control of a numerical control device supplying, in the form of electrical readout signals, programmed coordinate values defining the successive positions of said object along at least one direction of translation, said system comprising: a bench, a holder plate carrying said object above said bench, means for sliding said holder plate along at least said direction, first actuating means mechanically linked to said sliding means for generating a coarse displacement of said holder plate in response to said signals, second actuating means mechanically linked to said sliding means for superimposing to said coarse displacement a fine displacement capable of cancelling out any positional error of said object in relation to said programmed coordinate values, measuring means for providing digital data corresponding to quantized measurements of said displacements, and date comparator means having inputs for respectively receiving said signals and said digital data, and supplying upon halting of said first actuating means, error signals representative of said positional errors; said first actuating means having a control input for receiving said signals; said second actuating means having a control input for receiving said error signals.

For a better understanding of the invention and to show how the same may be carried into effect, reference will be made to the ensuing description and the following drawings among which:

FIG. 2 is a schematic illustration of the method of assembling the stepping motor and the associated stack of piezoelectric ceramics, on a translating plate.

Figure 1:
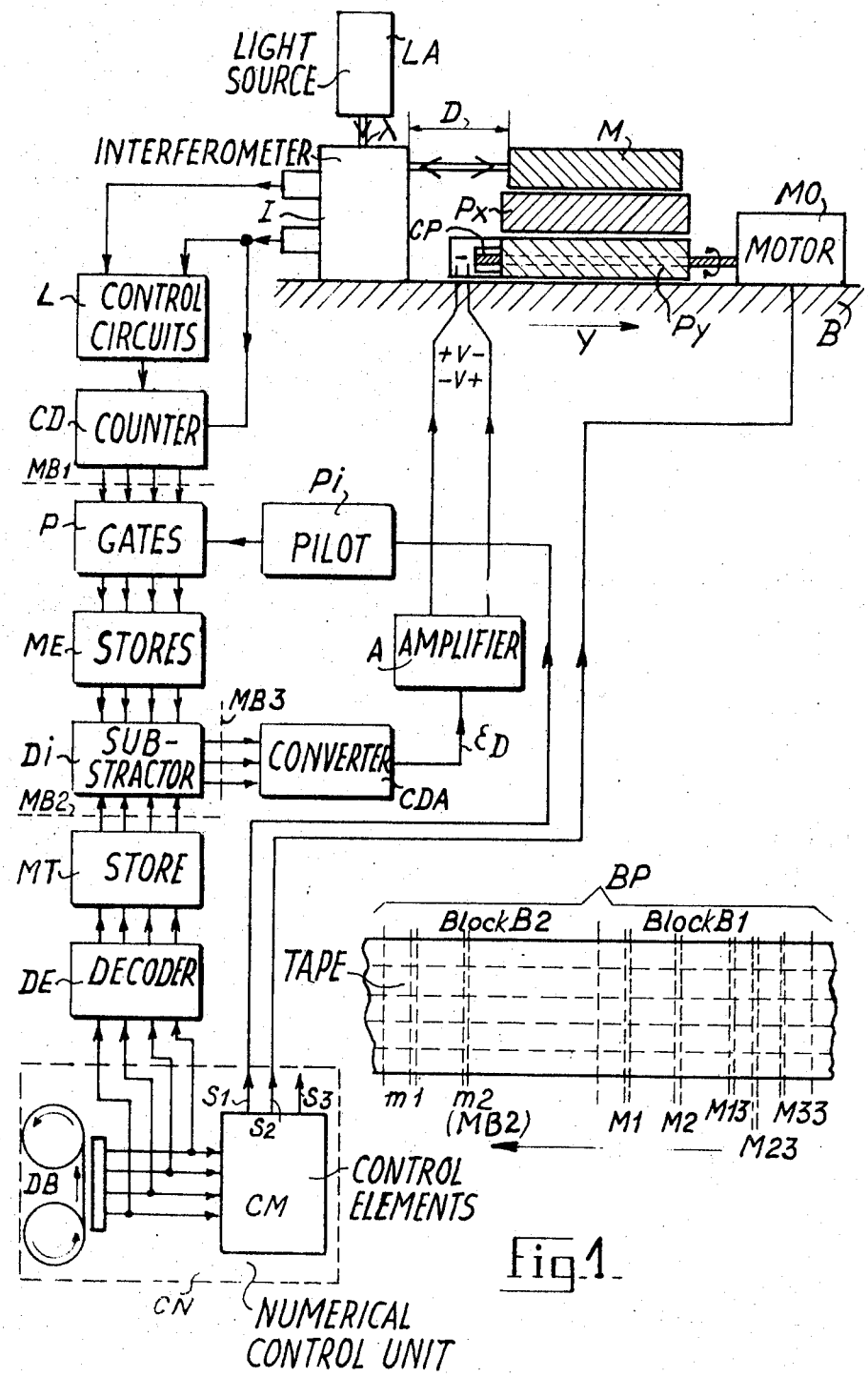
FIG. 1 is a simplified block diagram of a high-precision positioning system in accordance with the invention and of the control elements for one of its two translating plates.

As already mentioned, the improved "translating table" in accordance with the invention is particularly well suited to use on a mask machine; it is described specifically in this context here but it goes without saying that it could equally well be used in any other application.

On the frame B of the machine there are placed for example two crossed translation plates $P_x$ and $P_y$ movable in two directions X and Y which are perpendicular to one another. We shall confine ourselves here to a consideration of the plate $P_y$ and its control elements; an identical arrangement is fitted to the plate $P_x$.

A block M, to the sides of which mirrors perpendicular to the two directions X and Y are fixed, is assembled on the top plate and enables interferometer measurements of these translatory movements to be made. In the case of a mask machine it is upon this block that the photographic plate upon which the patterns will be recorded by means of a laser beam for example, is placed.

In order to improve the quality of the translatory movements themselves, it is generally the fact in such systems to provide attitude and yaw correcting elements which are operative during the course of these translatory movements. In this case, a correcting plate is arranged between the top plate $P_x$ and the plate M which carries the measuring mirrors.

The improvements to high-accuracy positioning systems, which form the subject of the present invention, relate more particularly to the numerical control elements and devices for accurately halting the plates, which elements and devices operate independently of the aforesaid elements which carry out correction of the translational movements; these latter elements are therefore not described here. However, it should be noted that their operation requires interferometer measuring devices for the translational movements, which devices will advantageously be employed to control the high-precision halting function in accordance with the invention.

Thus, as far as the translational movements of the plate $P_y$ in the Y direction, under the control of the stepping motor MO assembled on the plate in the manner indicated in FIG. 1, are concerned, these are measured by the interferometer unit I which is illuminated by a laser source LA operating at the wavelength λ and is associated with logic count-up/count-down circuits L followed by a digital counter CD producing parallel binary words $MB_1$. These words, at any instant, represent the distance D of the mirror carried by the block M, from a predetermined origin corresponding for example to a position O of the plate $P_y$. The counter CD displays a binary number N which enables the distance D translated in the Y direction, to be determined by the following relationship:

$$N.\Delta_Y < D < (N+1).\Delta^Y$$

where Δ Y is the measurement quantum of the interferometer system and is in fact equal, as explained hereinbefore, to a fraction $\lambda/4k$ of the wavelength λ of the source LA, k being the number ≥ 2 of interleaved fringe systems used.

This quantized measurement of the translational movements is utilized, in accordance with the invention, to supplement the displacements produced by the motor MO by fine displacements provided by the piezoelectric ceramic CP acting on the plate $P_y$ in the manner indicated in FIG. 2. For this purpose, these ceramics are controlled by a high-precision halting assembly which produces an error signal $\epsilon_D$ in the following manner:

A digital subtractor DI produces the difference between the last digits of the binary word $MB_1$ furnished by the counter CD, and the corresponding digits of the binary word $MB_2$ which represents the theoretical position the block M ought to occupy after halting of the stepping motor MO. It produces a word $MB_3$ which is the difference between $MB_1$ and $MB_2$ and applies it to a digital-analogue converter CDA. The amplitude of the voltage $\epsilon_D$ which is furnished by this converter, is proportional to the discrepancy between the true position of the block M after the motor MO has stopped and the desired theoretical position.

A differential amplifier A with two symmetrical outputs amplifies this error voltage $\epsilon_D$ and in a known manner, applies it to the stack of ceramics CP which control the displacement of the ball stop B of the screw W (FIG. 2) responsible for controlling the displacements of the plate $P_y$.

This high-accuracy halting assembly, which is supplementary to the motor MO, is only operated, as already described, when the motor has stopped. In order to enable this kind of operation to take place, electronic coincidence gates, AND-gates in other words, are included in the system generating the error signal $\epsilon_D$ and close the digital feedback loop only when the motor has stopped. These gates, schematically represented by the block P, are followed by intermediate stores ME and are for example arranged between the parallel outputs of the digital counter CD and the corresponding inputs of the digital subtractor DI. The control inputs (controlling their opening) of these gates are supplied with a signal $S_1$ coming from the numerical control elements CN of the system upon halting of motor MO. In order that the time constant of the electronic system of the digital loop, shall match the time constant of the mechanical system constituted by the plates $P_x$ and $P_y$ and the plate M, signal $S_1$ is applied to the gates P across a chopper pilot stage PI which periodically opens and closes the gates P at a frequency of 10 and 20 cycles per second for example in order to slice the feed-back control operation.

Taking into account the pitch and possible faults in the screw W which produces the step by step displacement of the plate $P_y$, and the number of steps per revolution on the part of the motor MO, the positioning can only be effected by the motor to an approximate value in the order of for example 5 to 10 μ.

The maximum range of the supplementary displacement produced by the ceramics CP, must be equal to or better than this value.

The digital control loop which has been described and which controls the ceramics, makes it possible to perfect the final positioning with a residual error which is close to the resolving power of the metrology laser, that is to say to the quantum ΔY. In the case of a conventional metrology system with two systems of interleaved fringes, this residual error is for example equal to λ /8 ± 0.08 μ. In the case where more than two, for example four, systems of interleaved fringes are used, this error can be less than 0.08 μ and indeed for example as low as 0.04 μ.

The positioning is thus defined to within a few hundredths of a micron by the digital control loop.

The numbers such as $MB_2$ which represent the theoretical positions which the plates must occupy and the signals controlling the motor MO, namely the signal $S_2$ as well as the signal closing the digital loop, namely $S_1$, are produced by the numerical control elements CN of the positioning system in accordance with the invention.

This numerical control system operates for example with the help of punched tapes representing the intended programme and relative in the case of mask machines, to the patterns which are to be recorded. A tape-wind mechanism DB is associated with the control elements CM of the motors MO.

The blocks $B_1$ carried by the punched tape BP represent the successive sequences of operation of the improved positioning system $P_x$, $P_y$ in accordance with the invention. Each block $B_1$ comprises an identification word $M_1$ which designates the displacement motor, for the X or Y directions, which is to be operated. This word $M_1$ is followed by a word $M_2$ indicating the number of steps through which the designated motor is to turn. Then there follow other words $M_{13}$, $M_{23}$, $M_{33}$ . . . which correspond with different auxiliary functions which have to be carried out when the motor has been stopped.

These functions for example control the closing of the high-precision digital positioning loop, the metrology laser devices, the recording of patterns etc.

The punched tape BP likewise carries blocks $B_2$ in which the identification word $m_1$ is not identified by the elements CM of the numerical control system but by an external decoding element DE, so that the following word, $m_2$, is processed by the circuits of the digital loop. This word $m_2$ represents the word $MB_2$ which gives the theoretical value of the position in which the block M is to be moved by the loop after the motor MO has stopped ; it is stored in a buffer store MT which follows the decoder DE. During the transfer of the tape, the blocks $B_2$ are presented first but, not being identified by the elements CN, have no effect upon the numerical control system proper ; instead, they fill the store MT with words $m_2 = MB_2$. The blocks $B_1$, which are subsequently presented have no effect upon the circuits DE, MT and control the block CM.

The high-accuracy system of positioning by translational movements in two mutually perpendicular directions X and Y, thus controlled by the stepping motors in conjunction with digital control loops enabling very accurate halting, are particularly relevant, as already stated, to applications in mask machines.

What I claim is :

1. A system for accurately positioning an object under the control of a numerical control device supplying, in the form of electrical readout signals, programmed coordinate values defining the successive positions of said object along at least one direction of translation, said system comprising : a bench, a holder plate carrying said object above said bench, means for sliding said holder plate along at least said direction, first actuating means mechanically linked to said sliding means for generating a coarse displacement of said holder plate in response to said signals, second actuating means mechanically linked to said sliding means for superimposing to said coarse displacement a fine displacement capable of cancelling out any positional error of said object in relation to said programmed coordinate values, measuring means for providing digital data corresponding to quantized measurements of said displacements, and data comparator means having inputs for respectively receiving said signals and said digital data, and supplying, upon halting of said first actuating means, error signals representative of said positional errors ; said first actuating means having a control input for receiving said signals ; said second actuating means having a control input for receiving said error signals.

2. A positioning system as claimed in claim 1, wherein said first actuating means comprise a stepping motor ; said coarse displacement being a step by step quantized displacement.

3. A positioning system as claimed in claim 1, wherein said second actuating means comprise at least one electro-mechanical transducer and means for supplying an analog voltage to said transducer ; said fine displacement being proportional to said analog voltage.

4. A positioning system as claimed in claim 1, wherein said measuring means include optical interferometric means having a measuring optical path parallel to said direction of translation.

5. A positioning system as claimed in claim 4, wherein sad interferometric means comprises a mirror integral with said holder plate and located on said measuring path ; said measuring further comprising a count-up count down logic circuit coupled to said interferometric means and counter means controlled by said interferometric means and said logic circuit for supplying said digital data.

6. A positioning system as claimed in claim 1, wherein said data comparator means comprise : digital substracting means having a first input for receiving in succession said coordinate values, a second input for receiving said digital data and an output ; said data comparator means further comprising a digital to analog convertor coupled to the output of said digital substracting means.

7. A positioning system as claimed in claim 6, wherein said digital substracting means comprise a substractor having two inputs, first storage means coupled to one of said substractor inputs for storing any one of said coordinate values, second storage means coupled to said other substractor input for storing said digital data, and gating means for feeding said digital data to said second storage means, upon halting of said first actuating means ; said gating means having a control input coupled to said numerical control device.

8. A positioning system as claimed in claim 7, wherein the control input of said gating means is fed from a chopper arrangement having an input coupled to said numerical control device.

9. A positioning system as claimed in claim 7, wherein said first storage means are fed from a decoder having at least one input coupled to said numerical control device.

10. A positioning system as claimed in claim 1, wherein said object is positionable in at least two directions of translation lying within a plane ; said sliding means comprising at least two superimposed carriages linking said bench to said holder plate and recpectively permitting displacements of said holder plate along said two directions of translation.

* * * * *